Jan. 25, 1966    T. R. ANDREWS    3,231,460
SHEET MATERIAL
Filed March 21, 1963
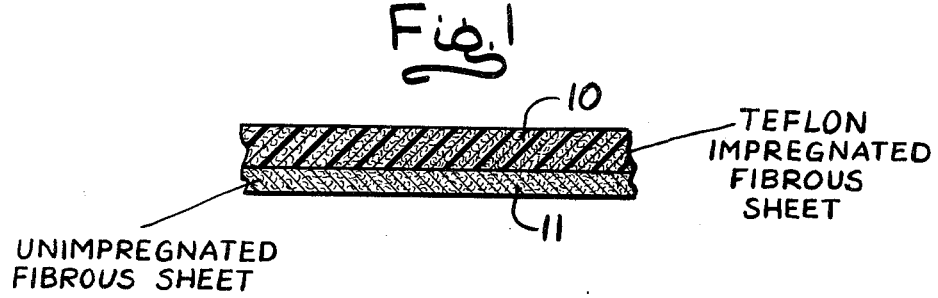
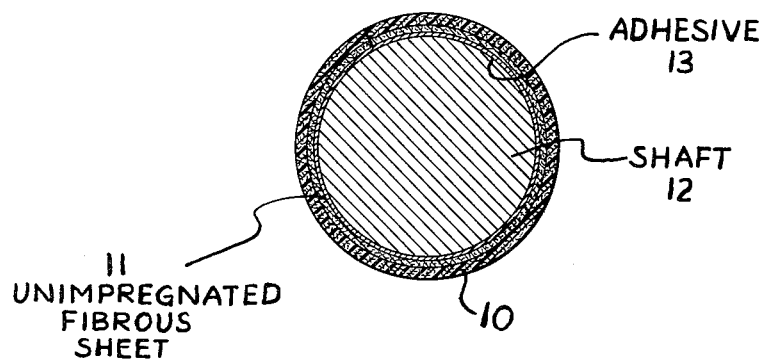
INVENTOR
THERON R. ANDREWS
by: Dary, Parker, Juettner & Cullinan
ATTYS.

3,231,460
SHEET MATERIAL
Theron R. Andrews, Milford, Conn., assignor to Raybestos-Manhattan, Inc., Passaic, N.J., a corporation of New Jersey
Filed Mar. 21, 1963, Ser. No. 266,785
10 Claims. (Cl. 161—189)

This invention relates to improvements in the production of polytetrafluoroethylene (Teflon) impregnated sheet material suitable for the production of laminates of novel character therefrom.

The present invention is particularly concerned with the production of gaskets, self-lubricating bearings and other chemical resistant surfaced materials, from polytetrafluoroethylene impregnated inorganic fiber sheet material.

The use of Teflon as an impregnant for the production of self-lubricating bearings is known and it is equally known that in view of the lubricating character of such material it is difficult to bond a Teflon surfaced material to a backing such as a metal plate, about a metal rod or within a metal tube, or to any other surface.

It is, therefore, an object of the present invention to provide fiber reinforced Teflon material which has good self-lubricating properties making it eminently suitable for use as internal or external bearing surfaces, while at the same time having good bonding properties to the metal or other supporting surface.

In accordance with the present invention, the fibrous reinforcement for the Teflon may be composed of felted, carded, or woven asbestos sheet material which may include other inorganic fibers such as glass fibers. To this Teflon impregnated sheet material I bond a sheet composed of similar inorganic fibrous sheet material which is free of Teflon. This unimpregnated layer then permits a laminate to be bonded by interposition of an adhesive between said layer and the surface to which it is to be bonded. The backing which is free of Teflon is impregnated, after the laminate is formed, with an adhesive so that the composite may then be suitably bonded to a suitable backing or support which is to carry the laminate or bearing.

Thus, in accordance with the practice of the present invention, I impregnate a sheet of either carded, woven, or felted asbestos fibers, which may include glass fibers, with an aqueous colloidal dispersion or suspensoid of Teflon so as to provide the sheet with a Teflon content of from about 50 to 85%, following which the sheet material is dried at a temperature of from about 200 to about 600° F. to volatilize the aqueous content of the Teflon dispersion.

FIG. 1 is an enlarged diagrammatic cross-sectional view of a laminate formed in accordance with the present invention.

FIG. 2 is a diagrammatic sectional view of a laminate formed in accordance with the present invention and applied to a shaft as an external bearing.

Referring to the drawings, the reference numeral 10 indicates a Teflon impregnated fibrous sheet material as hereinbefore described and reference numeral 11 indicates a similar but unimpregnated sheet of fibrous material bonded thereto. FIG. 2 illustrates the application of the laminate of FIG. 1 to, for example, a shaft for use as an external bearing thereon, the composite composed of the layers 10 and 11 being bonded to the shaft 12 by means of the interposed layer of adhesive 13.

For the foregoing purpose I find particularly useful felted fibrous sheet material composed of the dried residue of a colloidal dispersion of chrysotile asbestos fibers containing an organic chrysotile asbestos colloidizing agent as set forth in United States Patent 2,626,213 and others issued to I. J. Novak, or the similar sheet material described in United States Patent 2,772,157 to Cilley et al. containing glass fibers. Due to the poor wet strength of such sheet material when it is used I first pyrolyze it to remove residual organic dispersing or colloidizing agent by heating it at a temperature which is wholly or substantially destructive of the organic content such as for example for about 15 seconds at about 800–900° F., to about 5 to about 10 seconds at about 1200° F., it being understood that the time and temperature are correlated to remove said organic content from the sheet without causing the asbestos to lose its water of crystallization, and without at this point sintering or coalescing of the Teflon particles. This dispersed asbestos sheet material is particularly suitable because of its uniformity and to obtain thicknesses of uniform character.

I thereafter produce a laminate composed of a plurality of plies of the aforesaid Teflon impregnated sheet material together with a backing ply of the same sheet material but which has not been subjected to impregnation with Teflon or any other binder. It will be understood that the plies subjected to lamination may be suitably blanked to desired shape such as ring form or cut into strips of desirable width or length.

The plies of material as so laid up are then subjected to conditions of temperature above 620° F., and pressure so as to consolidate the plies and to coalesce the Teflon particles. In the alternative, the Teflon impregnated sheets may be first subjected to sintering temperature, and then consolidated with an unimpregnated ply by subjecting the assembly to consolidating pressure and sintering temperature, i.e. above 620° F. and below the degradation temperature of the mineral fibers.

The unsintered sheet material may, for example, be composed of 60% by weight of asbestos fibers and 40% by weight of glass fibers impregnated with Teflon to provide the web with a 76% by weight content thereof. The plies are then consolidated at a pressure of from about 50 to about 3000 pounds per square inch at a temperature from about 700–800° F. so as to consolidate the plies and sinter, fuse or coalesce the virgin Teflon particles together.

For use as an external bearing on a shaft a strip is formed of a length equal to that of the circumference of the shaft since for such use only one layer of laminate can be employed in order to provide a smooth external surface and to have uniform thickness. In the alternative, the bearing may be pre-molded to ring form.

Again, when bearings or gaskets are desired of flat ring form these may be formed from pre-cut discs and laminated in a shaped mold of desired contour and thickness.

On the other hand, bearings, gaskets of desired shape may be subsequently cut from laminated sheet material characterized by an unimpregnated backing, and for other uses where it is desired to have fiber reinforced Teflon surface bonded to a carrier such as a metal or wood backing, or some other body, such as one composed of a resin impregnate.

The laminate formed in accordance with the present invention may be bonded by interposing suitable adhesive between the unimpregnated surface of the laminate and the support to which it is to be bonded, or more conveniently adhesive may be pre-applied to the laminate so as to impregnate the surface which is free from or substantially free from Teflon by dipping the whole in liquid adhesive and then wiping the adhesive from the Teflon face for maximum penetration. In bonding the laminate to a supporting surface a second layer of adhesive can then be interposed between the supporting surface and the laminate. In the alternative, one or both of the aforesaid layers of adhesive can be applied by means of rolls applied directly to the surface of the laminate which does not carry the Teflon.

The adhesive employed for bonding the laminate to a supporting surface can be thermosetting phenol formaldehyde resin or an adhesive such as an epoxy resin composed for example of epichlorohydrin and bisphenol which can be cured by heat, or one which sets at room temperature. The laminate can then be bonded in place by pressure, and if necessary heat, sufficient only to harden or cure the adhesive. Strong bonds can thus be effected to metal, wood, plastic or some other surface to form a good bearing surface thereon or one which requires the properties of Teflon.

The interposed adhesive can be provided by the base to which the laminate of Teflon impregnated top and unimpregnated backing is to be bonded. Thus the aforesaid laminate may be bonded to one or more plies of sheet material containing thermosetting resin in uncured form, such as B-stage phenolic resin impregnated sheet material, and the assembly then laminated by press curing at temperatures of about 325–350° F.

The laminate of the present invention is particularly useful where an old sleeve bearing has been burned out, it being only necessary to wrap a strip of laminate about the shaft and adhere it in place by means of the backing which may be free or substantially free of Teflon and readily bondable. Other typical uses, for the purpose of illustration and not limitation, have been found as a surfacing for skis, plowshares, pastry boards, rolling pins, counter tops, tank or container lining, internal bearing lining, and the like. An internal bearing can be lined by holding a strip or pre-form in place by means such as a spring steel sleeve to apply pressure while heat curing in an oven.

I claim:

1. A laminate comprised of at least one ply of mineral fiber sheet material impregnated with the dried and sintered residue of an aqueous colloidal dispersion of polytetrafluoroethylene particles providing the ply with from about 50 to about 85% by weight of said polytetrafluoroethylene, and a coherent ply consisting of porous mineral fiber.

2. The product of claim 1 wherein the mineral fibers are the dried residue of a colloidal dispersion of chrysotile asbestos fibers.

3. The product of claim 1 wherein the polytetrafluoroethylene-free ply is impregnated with an adhesive.

4. The product of claim 1 wherein the polytetrafluoroethylene-free ply is bonded to a supporting surface.

5. The method of forming a readily bondable polytetrafluoroethylene laminate which comprises impregnating a sheet comprised of mineral fiber with an aqueous colloidal dispersion of polytetrafluoroethylene particles, drying the sheet at a temperature below the sintering temperature of said particles, and then laminating said impregnated sheet to an unimpregnated mineral fiber sheet under consolidating pressure and at a temperature to coalesce said colloidal particles without degradation of said mineral fibers.

6. The method of forming a readily bondable polytetrafluoroethylene laminate which comprises impregnating a sheet comprised of asbestos fiber with an aqueous colloidal dispersion of polytetrafluoroethylene particles, drying the sheet at a temperature below the sintering temperature of said particles, and then laminating said impregnated sheet to an unimpregnated asbestos fiber sheet under consolidating pressure and at a temperature to coalesce said colloidal particles without degradation of said asbestos fibers.

7. The method of forming a readily bondable polytetrafluoroethylene laminate which comprises impregnating a sheet comprised of asbestos and glass fibers with an aqueous colloidal dispersion of polytetrafluoroethylene particles, drying the sheet at a temperature below the sintering temperature of said particles, and then laminating said impregnated sheet to an unimpregnated asbestos and glass fiber sheet under consolidating pressure and at a temperature to coalesce said colloidal particles without degradation of said asbestos and glass fibers.

8. The method which comprises impregnating a sheet comprised of fibrous asbestos with an aqueous colloidal dispersion of polytetrafluoroethylene particles, drying the sheet at a temperature below the sintering temperature of said particles, laminating a plurality of plies of said impregnated material to a ply of unimpregnated mineral fiber sheet material under consolidating pressure and at a temperature to coalesce said colloidal particles without degradation of said fibers, and then impregnating said unimpregnated ply with an adhesive.

9. The method which comprises impregnating a sheet comprised of fibrous asbestos with an aqueous colloidal dispersion of polytetrafluoroethylene particles, drying the sheet at a temperature below the sintering temperature of said particles, laminating a plurality of plies of said impregnated material to a ply of unimpregnated mineral fiber sheet material under consolidating pressure and at a temperature to coalesce said colloidal particles without degradation of said fibers, and then impregnating said unimpregnated ply with an adhesive and bonding it thereby to a support therefor.

10. The method of forming a readily bondable polytetrafluoroethylene laminate which comprises impregnating a sheet comprised of mineral fiber with an aqueous colloidal dispersion of polytetrafluoroethylene particles to provide the sheet with from about 50% to about 85% by weight of said particles, drying the sheet, and then laminating said impregnated sheet to an unimpregnated mineral fiber sheet under consolidating pressure and at a temperature above 620° F. and below the degradation temperature of said mineral fibers.

References Cited by the Examiner

UNITED STATES PATENTS

| | | | |
|---|---|---|---|
| 2,587,171 | 2/1952 | Knewstubb et al. | 156—254 |
| 2,642,370 | 6/1953 | Parsons et al. | 161—203 |
| 2,728,698 | 12/1955 | Rudner | 161—92 |
| 2,731,068 | 1/1956 | Richards | 161—203 |
| 2,772,157 | 11/1956 | Cilley et al. | 161—203 |
| 2,777,783 | 1/1957 | Welch. | |
| 3,056,709 | 10/1962 | Rising et al. | 156—7 |
| 3,059,318 | 10/1962 | Herbert et al. | |
| 3,082,485 | 3/1963 | Thomas. | |

EARL M. BERGERT, *Primary Examiner.*

J. J. BURNS, H. F. EPSTEIN, *Assistant Examiners.*